(12) United States Patent
Mu

(10) Patent No.: US 12,113,630 B2
(45) Date of Patent: Oct. 8, 2024

(54) METHOD AND DEVICE FOR DETERMINING RESOURCE MULTIPLEXING, METHOD AND DEVICE FOR INFORMATION DEMODULATION AND MEDIUM THEREOF

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 327 days.

(21) Appl. No.: 17/637,061

(22) PCT Filed: Aug. 19, 2019

(86) PCT No.: PCT/CN2019/101451
§ 371 (c)(1),
(2) Date: Feb. 21, 2022

(87) PCT Pub. No.: WO2021/031088
PCT Pub. Date: Feb. 25, 2021

(65) Prior Publication Data
US 2022/0303063 A1    Sep. 22, 2022

(51) Int. Cl.
*H04L 1/1829*   (2023.01)
*H04L 5/00*   (2006.01)
*H04W 72/23*   (2023.01)

(52) U.S. Cl.
CPC .......... *H04L 1/1854* (2013.01); *H04L 5/0055* (2013.01); *H04W 72/23* (2023.01)

(58) Field of Classification Search
None
See application file for complete search history.

(56) References Cited

U.S. PATENT DOCUMENTS

| 2018/0076942 A1 | 3/2018 | Nory et al. |
| 2019/0045546 A1 | 2/2019 | Li |

(Continued)

FOREIGN PATENT DOCUMENTS

| CN | 110024467 A | 7/2019 |
| CN | 110035531 A | 7/2019 |

OTHER PUBLICATIONS

International Search Report of PCT/CN2019/101451 dated May 20, 2020 with English translation, (6p).

(Continued)

*Primary Examiner* — Marcus Smith
(74) *Attorney, Agent, or Firm* — Arch & Lake LLP

(57) ABSTRACT

A method for determining resource multiplexing is provided. The method includes: when it is determined that a first physical uplink control channel (PUCCH) resource of a hybrid automatic repeat request response (HARQ-ACK) of a first type of service and a second PUCCH resource of an HARQ-ACK of a second type of service overlap in a time domain, determining whether the first PUCCH resource and the second PUCCH resource meet a preset timing sequence in the time domain; and if same meet the preset timing sequence condition, then determining performing resource multiplexing processing on the HARQ-ACK of the first type of service and the HARQ-ACK of the second type of service.

9 Claims, 6 Drawing Sheets

To determine that when the first physical uplink control channel (PUCCH) resource of the hybrid automatic repeat request acknowledgement (HARQ-ACK) of the first service type and the second PUCCH resource of the HARQ-ACK of the second service type overlap in the time domain, it is judged whether the first PUCCH resource and the second PUCCH resource satisfy a preset timing condition in the time domain — S11

If the preset timing condition is satisfied, it is determined to perform resource multiplexing processing on the HARQ-ACK of the first service type and the HARQ-ACK of the second service type — S12

(56) References Cited

U.S. PATENT DOCUMENTS

| | | | |
|---|---|---|---|
| 2019/0104516 A1 | 4/2019 | Oh et al. | |
| 2020/0322120 A1* | 10/2020 | Yang | H04L 1/1664 |
| 2022/0150942 A1* | 5/2022 | Xu | H04W 72/0446 |
| 2022/0295473 A1* | 9/2022 | Yin | H04L 1/1812 |

OTHER PUBLICATIONS

Vivo, "Discussion on eMBB and URLLC UCI Multiplexing", Discussion and Decision, 3GPP TSG RAN WG1 Meeting #93, R1-1806064, Busan, Korea, May 21-25, 2018, (4p).

Fujitsu, "Discussion on HARQ-ACK Feedback Over PUCCH and PUSCH", Discussion and Decision, 3GPP TSG RAN WG1 Meeting #94bis, R1-1810596, Chengdu, China, Oct. 8-12, 2018, (5p).

Vivo, "UCI Enhancements for URLLC", Discussion and Decision, 3GPP TSG RAN WG1 #97 R1-1906147, Reno, NV, May 13-17, 2019, (11p).

LG Electronics, "UCI Enhancements for NR URLLC", Discussion and Decision, 3GPP TSG RAN WG1 #96bis R1-1904628, Xi'an, China, Apr. 8-12, 2019, (6p).

* cited by examiner

METHOD AND DEVICE FOR DETERMINING RESOURCE MULTIPLEXING, METHOD AND DEVICE FOR INFORMATION DEMODULATION AND MEDIUM THEREOF

CROSS REFERENCE

The present application is the U.S. National Stage Application of International Application No. PCT/CN2019/101451, filed on Aug. 19, 2019, the contents of which are incorporated herein by reference in their entireties for all purposes.

BACKGROUND

In the New Radio (NR) of the 5th generation mobile networks (5th generation wireless systems, hereinafter referred to as the "5G"), the Ultra Reliable and Low Latency Communication (URLLC) service is a very important type of service. Generally, a URLLC service requires high reliability and low latency to a great extent. Another service type is the Enhanced Mobile Broadband (eMBB) service type, which generally requires a relatively high rate, without requiring very low latency and very low error rate.

SUMMARY

The present disclosure relates to communication technologies, and in particular to a method and device for determining resource multiplexing, a method and device for information demodulation and a computer storage medium thereof.

In a first aspect of the present disclosure, a method for determining resource multiplexing is provided. The method includes: in response to determining that a first physical uplink control channel PUCCH resource of a hybrid automatic repeat request response HARQ-ACK of a first service type overlaps with a second PUCCH resource of an HARQ-ACK of a second service type overlap in a time domain, determining whether the first PUCCH resource and the second PUCCH resource on the time domain satisfy a preset timing condition; and in response to determining that the preset timing condition is satisfied, performing resource multiplexing processing on the HARQ-ACK of the first service type and the HARQ-ACK of the second service type.

In a second aspect of the disclosure, a method for information demodulation is provided. The method includes: in response to determining that a terminal satisfies a resource multiplexing condition, determining a PUCCH resource for simultaneously carrying an HARQ-ACK information of a first service type and an HARQ-ACK information of a second service type; and demodulating the HARQ-ACK information of the first service type and the HARQ-ACK information of the second service type from the PUCCH resource.

In a third aspect of the disclosure, a device for determining resource multiplexing is provided The device includes a processor and a memory, for storing instructions executable by the processor.

Further, the processor is configured to implement acts including: in response to determining that a first PUCCH resource of a hybrid automatic repeat request response HARQ-ACK of a first service type overlaps with a second PUCCH resource of an HARQ-ACK of a second service type overlap in a time domain, determining whether the first PUCCH resource and the second PUCCH resource on the time domain satisfy a preset timing condition; and in response to determining that the preset timing condition is satisfied, performing resource multiplexing processing on the HARQ-ACK of the first service type and the HARQ-ACK of the second service type.

In a fourth aspect of the disclosure, an information demodulation device is provided. The device includes a processor and a memory for storing instructions executable by the processor.

Further, the processor is configured to implement the information demodulation method based on the method according to the second aspect when executing the executable instructions.

In a fifth aspect of the disclosure, a computer storage medium is provided, where executable instructions are stored in the computer storage medium, and when the executable instructions are executed by a processor, the processor executing the method for determining resource multiplexing based on the method according to the first aspect above.

In a sixth aspect of the disclosure, a computer storage medium is provided, where executable instructions are stored in the computer storage medium, and when the executable instructions are executed by a processor, the processor executing the information demodulation method based on the method according to the second aspect above.

It should be understood that the foregoing general description and the following detailed description are exemplary and explanatory without restricting the present disclosure.

BRIEF DESCRIPTION OF THE DRAWINGS

The accompanying drawings herein, which are incorporated in and constitute a part of this specification, illustrate embodiments consistent with the disclosure, and serve to explain the principles of the disclosure together with the description.

DETAILED DESCRIPTION OF THE EMBODIMENTS

Examples will be described in detail herein, with examples being illustrated in the accompanying drawings. Unless otherwise indicated, where the following description refers to the drawings, the same numerals refer to the same or similar elements in different drawings. The implementations described in the following examples do not represent all implementations consistent with the embodiments of the present disclosure. Rather, they are merely examples of devices and methods consistent with some aspects of the embodiments of the present disclosure, as recited in the appended claims.

The terms used in the embodiments of the present disclosure are only for the purpose of describing particular embodiments, and are not intended to limit the embodiments of the present disclosure. As used in the embodiments of the present disclosure and the appended claims, unless the context clearly dictates otherwise, the singular forms "a", "an" and "the" are intended to include the plural forms as well. It should also be understood that the term "and/or" as used herein refers to and includes any and all possible combinations of one or more of the associated listed items.

It should be understood that, though the terms "first", "second", "third", etc. may be used in embodiments of the present disclosure to describe various information, such information should not be limited to these terms. These terms are only used to distinguish the same type of information from each other. For example, without departing from the scope of the embodiments of the present disclosure, the first information may also be referred to as the second information, and vice versa. Depending on the context, the terms "what if" and "if" as used herein can be interpreted as "while" or "when" or "in response to determining".

Figures 1, 2:
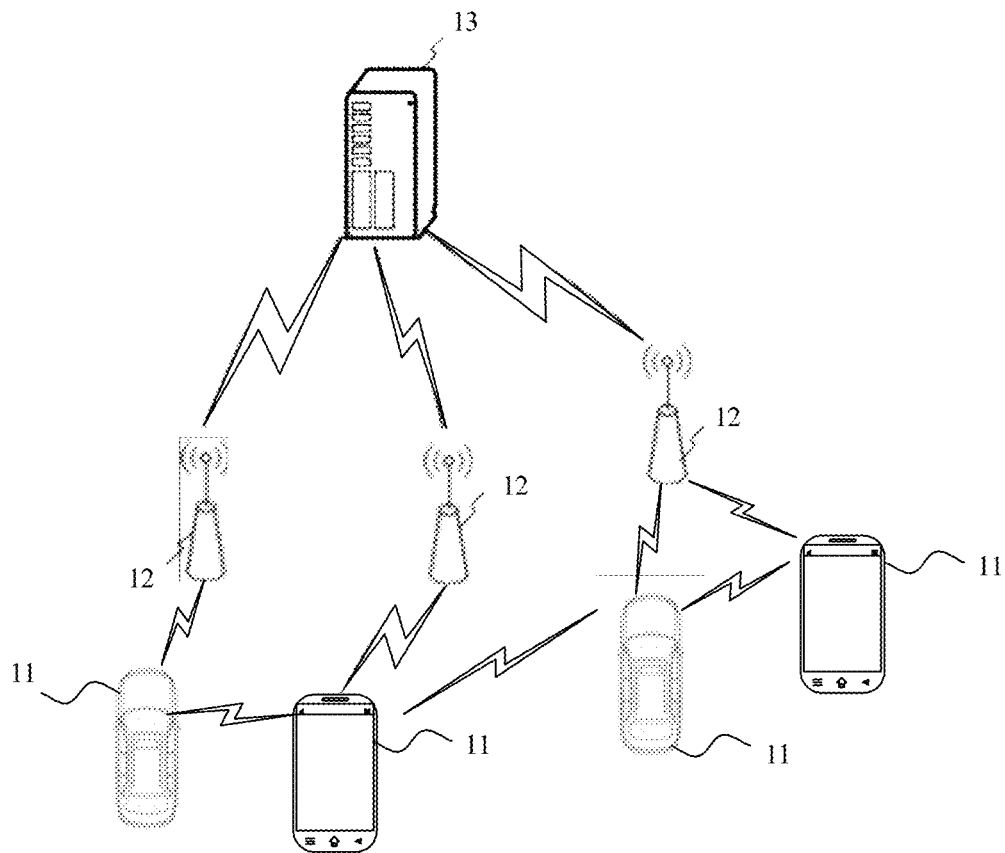
FIG. 1 is a schematic structural diagram of a wireless communication system based on an example.
FIG. 2 is a flow chart of a method for determining resource multiplexing based on an example.

Please refer to FIG. 1, which shows a schematic structural diagram of a wireless communication system based on an embodiment of the present disclosure. As shown in FIG. 1, the wireless communication system is a communication system based on cellular mobile communication technology, and the wireless communication system may include several terminals 11 and several base stations 12.

The terminal 11 may be a device that provides voice and/or data connectivity to the users. The terminal 11 may communicate with one or more core networks via a Radio Access Network (RAN), and the terminal 11 may be an IoT terminal such as a sensor device, a mobile phone (or a "cellular phone") and a computer with an IoT terminal, for example, a fixed, portable, pocket, hand-held, built-in computer or vehicle-mounted device, and further for example, Station (STA), subscriber unit, subscriber station, mobile station, mobile, remote station, access point, remote terminal, access terminal, user terminal, user agent, user device, or user equipment (UE). Alternatively, the terminal 11 may also be a device of an unmanned aerial vehicle. Alternatively, the terminal 11 may also be a vehicle-mounted device, for example, a trip computer with a wireless communication function or a wireless communication device externally connected to the trip computer. Alternatively, the terminal 11 may also be a roadside device, for example, a street light, a signal light or other roadside devices with a wireless communication function.

The base station 12 may be a network-side device in a wireless communication system, the wireless communication system may be a $4^{th}$ generation mobile communication (4G) system, also known as a Long Term Evolution (LTE) system, or, the wireless communication system may also be a 5G system, also known as New Radio (NR) system or 5G NR system. Alternatively, the wireless communication system may also be a next-generation system of the 5G system, the access network in the 5G system may be called NG-RAN (New Generation-Radio Access Network), and alternatively, a Machine-Type Communication (MTC) system.

The base station 12 may be an eNB used in the 4G system. Alternatively, the base station 12 may also be a gNB that adopts a centralized distributed architecture in the 5G system. When the base station 12 adopts a centralized distributed architecture, it usually includes a central unit (CU) and at least two distributed units (DU). The central unit is provided with a protocol stack of a Packet Data Convergence Protocol (PDCP) layer, a Radio Link Control Protocol (RLC) layer and a Media Access Control (MAC) layer; the distributed unit is provided with a physical (PHY) layer protocol stack, and the specific implementation manner of the base station 12 is not limited in the embodiments of the present disclosure.

Wireless connection can be configured between the base station 12 and the terminal 11 through a wireless radio. In different embodiments, the wireless radio is a wireless radio based on the $4^{th}$ generation mobile communication network technology (4G) standard; or, the wireless radio is a wireless radio based on the $5^{th}$ generation mobile communication network technology (5G) standard, for example, the wireless radio is a new radio; alternatively, the wireless radio may also be a wireless radio based on a next-generation of 5G mobile communication network technology standard.

In some embodiments, an End to End (E2E) connection may also be established between the terminals 11. For example, scenes like Vehicle to Vehicle (V2V) communication, Vehicle to Infrastructure (V2I) communication and Vehicle to Pedestrian (V2P) communication in Vehicle to Everything (V2X) communication.

In some embodiments, the wireless communication system may further include a network management device 13.

Several base stations 12 are respectively connected to the network management device 13, the network management device 13 may be a core network device in a wireless communication system, for example, the network management device 13 may be a mobility management entity (MME) in an evolved packet core network (EPC). Alternatively, the network management device may also be other core network devices, such as a serving gateway (SGW), a public data network gateway (PGW), a policy and charging rules function unit (PCRF) or a home subscriber server-side equipment (HSS). The implementation form of the network management device 13 is not limited by the embodiments of the present disclosure.

In 5G NR, the high reliability and low latency (URLLC) service is a very important service type and will be widely used in 5G scenes such as factory automation, remote control and augmented reality (AR)/virtual reality (VR). URLLC services usually require high reliability and low latency to a great extent. Another service type is the enhanced mobile broadband (eMBB) service type, which usually requires a higher rate without requiring very low latency and very low error rate.

In the related protocol, the physical PUCCH resources configured by the base station for the UE can have 5 formats from 0 to 4, which can be divided into two categories: 4-14 time domain symbols occupied by the long-format PUCCH resources, 1-2 time domain symbols occupied by the short-format PUCCH resources. The advantage of the short-format PUCCH is that it can reduce the transmission time of the PUCCH channel. The long-format PUCCH resources occupy more resources in the time domain, and in the case of the same control information load, the number of resource blocks (RB) occupied in the frequency domain can be reduced. And under the same coverage requirement, the transmit power to the UE can also be reduced.

The current configuration of PUCCH resources is divided into PUCCH resources configured based on the slot level and PUCCH resources configured based on the subslot level. When the PUCCH resources are configured based on the slot level, that is, the base station will configure a maximum of 4 PUCCH resource sets for the UE in each slot, and each PUCCH resource set can carry a corresponding amount of uplink control information payload (UCI payload). The ranges of UCI payloads that can be carried by different PUCCH resources do not overlap with each other. In the existing protocol, for slot level PUCCH resource configuration, the UCI payload corresponding to PUCCH resource set 0 is 1 to 2 bits, the UCI payload corresponding to PUCCH resource set 1 is 3 to N1 bits, and the UCI payload corresponding to PUCCH resource set 2 is N1+1 to N2 bit, and the UCI payload corresponding to PUCCH resource set 3 is N2+1 to 1706 bit, where N1 and N2 are values that can be configured by the base station. There are multiple PUCCH resources in each PUCCH resource set, and such multiple PUCCH resources can be distinguished by using a PUCCH resource identity (ID). The PUCCH resource configurations in different slots are the same. There is a Hybrid Automatic Repeat request acknowledgement (HARQ-ACK) feedback opportunity in each slot.

For the subslot level PUCCH resource configuration, that is, a slot is divided into multiple subslots, and the configuration of PUCCH resources is configured based on the subslot, that is, each subslot is configured with multiple PUCCH resource sets, each PUCCH resource set includes multiple PUCCH resources. There is one HARQ-ACK feedback opportunity in each subslot. Therefore, the latency of HARQ-ACK feedback can be reduced, and the low latency feature of the URLLC service can be better supported.

In the related art, the UE can determine the PUCCH resources used by a certain HARQ-ACK codebook, in which one HARQ-ACK codebook includes HARQ-ACK feedback information bits of one or more Physical Downlink Shared Channels (PDSCH). The method for the UE to determine the PUCCH resource used by a certain HARQ-ACK codebook is as follows:

The UE selects the corresponding PUCCH resource set based on the number of bits of the HARQ-ACK codebook;

The specific PUCCH resource is determined based on the indication information in the last DCI of the multiple downlink scheduling DCIs corresponding to the multiple PDSCHs corresponding to the HARQ-ACK codebook. The resource indication includes two aspects: (1) transmission of the interval k1 between the slot/subslot where the PUCCH resource of HARQ-ACK is located and the slot/subslot where the PDSCH is located, k1 is measured by slot/subslot, if the slot/subslot where the PDSCH is located is n, the slot/subslot where the HARQ-ACK is located is n+k1; (2) the specific index of the PUCCH resource used by the HARQ-ACK information, that is, the PUCCH resource ID.

In a scenario where two types of services, eMBB and URLLC, are concurrent, the HARQ-ACK information of eMBB is generally transmitted by using long-format PUCCH resources, and the PUCCH resources are PUCCH resources configured at the slot level. On the other hand, the URLLC HARQ-ACK information is transmitted using a short-format PUCCH resource, and the PUCCH resource is a PUCCH resource configured at the subslot level. At this time, there may be a situation where one eMBB HARQ-ACK information and multiple URLLC HARQ-ACK information overlap in time domain, resulting in time domain conflict of PUCCH resources, therefore, multiple HARQ-ACK information is required to be multiplexed.

Based on the above wireless communication system, for the purpose of multiplexing multiple HARQ-ACK information, various embodiments of the method of the present disclosure are proposed.

FIG. nm. 2 is a flow chart showing a method for determining resource multiplexing based on an example, which is applied to the terminal side, as shown in FIG. 2, and includes the following steps:

In step S11, to determine that when the first physical uplink control channel (PUCCH) resource of the hybrid automatic repeat request acknowledgement (HARQ-ACK) of the first service type and the second PUCCH resource of the HARQ-ACK of the second service type overlap in the time domain, it is judged whether the first PUCCH resource and the second PUCCH resource satisfy a preset timing condition in the time domain.

For example, the first service type is eMBB service, and the second service type is URLLC service.

As an embodiment, the preset timing conditions include:

The interval between the first time domain symbol and the second time domain symbol is greater than or equal to a preset value;

the first time domain symbol is the time domain symbol with the earliest starting position for the first PUCCH resource of the HARQ-ACK of the first service type and the second PUCCH resource of the HARQ-ACK of the second service type;

The second time-domain symbol is the time-domain symbol with the latest ending position for the PDSCH corresponding to the HARQ-ACK of the first service type and the PDSCH corresponding to the HARQ-ACK of the second service type.

Figure 3:
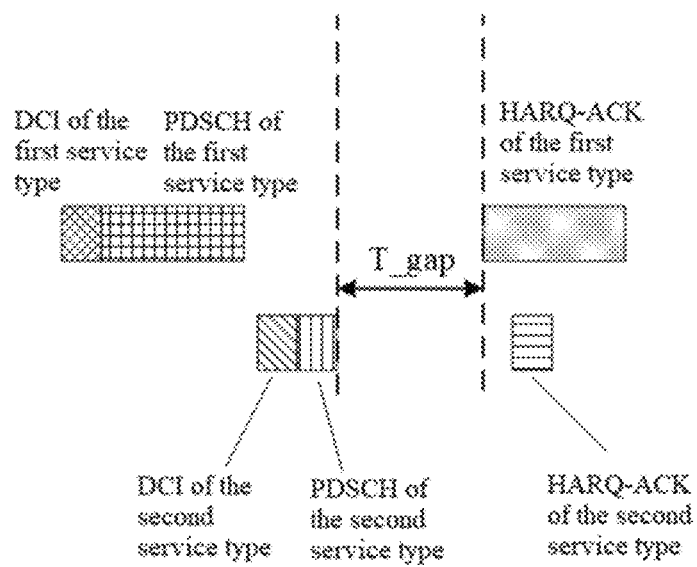
FIG. 3 is a schematic diagram of the principle of preset timing conditions based on an example.

FIG. 3 shows a schematic diagram of the principle of preset timing conditions. As shown in FIG. 3, the symbol with the earliest starting position for the PUCCH resources of the HARQ-ACK of the first service type and the PUCCH resources of the HARQ-ACK of the second service type, and the time interval between the symbols with the latest end positions of the two PDSCHs corresponding to the two is T_gap, and the T_gap must be greater than or equal to the preset time interval T.

The preset time interval T may be pre-defined, and the preset time interval T may be related to parameters such as subcarrier spacing.

In step S12, if the preset timing condition is satisfied, it is determined to perform resource multiplexing processing on the HARQ-ACK of the first service type and the HARQ-ACK of the second service type.

As an embodiment, the resource multiplexing process includes:

The HARQ-ACK information of the first service type and the HARQ-ACK information of the second service type are carried on the same PUCCH resource for transmission.

In this way, by performing resource multiplexing processing on the HARQ-ACK of the first service type and the HARQ-ACK of the second service type, so as to solve the time domain conflict of multiple PUCCH resources.

In the solution above, the method also includes:

The PUCCH resource configured based on the subslot level is selected as the PUCCH resource carrying the HARQ-ACK information of the first service type and the HARQ-ACK information of the second service type.

In selecting the PUCCH resource that carries the multiplexed HARQ-ACK information, if the PUCCH resource configured at the slot level is selected, the selected PUCCH resource may overlap with the URLLC HARQ-ACK PUCCH resource of the next subslot in time domain, further resulting in another complex case of performing a multiplexing. The advantage of using the PUCCH resources configured at the subslot level is that the PUCCH resources configured based on the subslot level are all included in one subslot, so that the selected PUCCH resources does not overlap with the URLLC HARQ-ACK PUCCH resource of the next subslot in the time domain.

As an implementation, selecting the PUCCH resources configured based on the subslot level as the PUCCH resources that carry the HARQ-ACK information of the first service type and the HARQ-ACK information of the second service type, including:

based on the indication of the DCI corresponding to the HARQ-ACK information of the second service type, selecting a PUCCH resource as the PUCCH resource carrying the HARQ-ACK information of the first service type and the HARQ-ACK information of the second service type.

As an implementation, selecting a PUCCH resource based on the indication of the DCI corresponding to the HARQ-ACK information of the second service type, as the PUCCH resources of the HARQ-ACK information of the first service type and the HARQ-ACK information of the second service type, including:

determining the PUCCH resource set based on the number of bits of the HARQ-ACK information of the first service type and the number of bits of the HARQ-ACK information of the second service type;

based on the PUCCH resource identity indicated by the DCI corresponding to the HARQ-ACK of the second service type, determining the PUCCH resources for transmitting the HARQ-ACK information of the first service type and the HARQ-ACK information of the second service type from the PUCCH resource set.

In this way, when it is determined to perform resource multiplexing processing on the HARQ-ACK of the first service type and the HARQ-ACK of the second service type, the selection method for selecting the PUCCH resource for transmitting the multiplexed HARQ-ACK information is given.

In the solution above, based on the PUCCH resource identity indicated by the DCI corresponding to the HARQ-ACK of the second service type, determining the PUCCH resources for transmitting the HARQ-ACK information of the first service type and the HARQ-ACK information of the second service type from the PUCCH resource set, including:

when the second PUCCH resources of the HARQ-ACK of two or more of the second service type overlaps with the first PUCCH resources of the HARQ-ACK of the first service type in the time domain, based on the PUCCH resource identity indicated by the corresponding DCI of the HARQ-ACK of the first second service type in time, determining the PUCCH resource for transmitting the HARQ-ACK information of the first service type and the HARQ-ACK information of the second service type from the PUCCH resource set.

It should be noted that the time domain overlap may be a partial overlap or a complete overlap.

In the technical solutions described in the embodiments of the present disclosure, when the first PUCCH resource of the HARQ-ACK of the first service type is determined to overlap with the second PUCCH resource of the HARQ-ACK of the second service type in the time domain, and when the first PUCCH resource and the second PUCCH resource in the time domain satisfy the preset timing condition, it is determined to perform resource multiplexing processing on the HARQ-ACK of the first service type and the HARQ-ACK of the second service type; in this way, by carrying the HARQ-ACK information of the first service type and the HARQ-ACK information of the second service type on the same PUCCH resource for transmission, the time domain conflict of multiple PUCCH resources is solved.

In the following, taking the first service type being the eMBB service, the second service type being the URLLC service, and the preset value being 2 time intervals as an example, it is illustrated whether the preset timing condition is satisfied.

Figure 4:
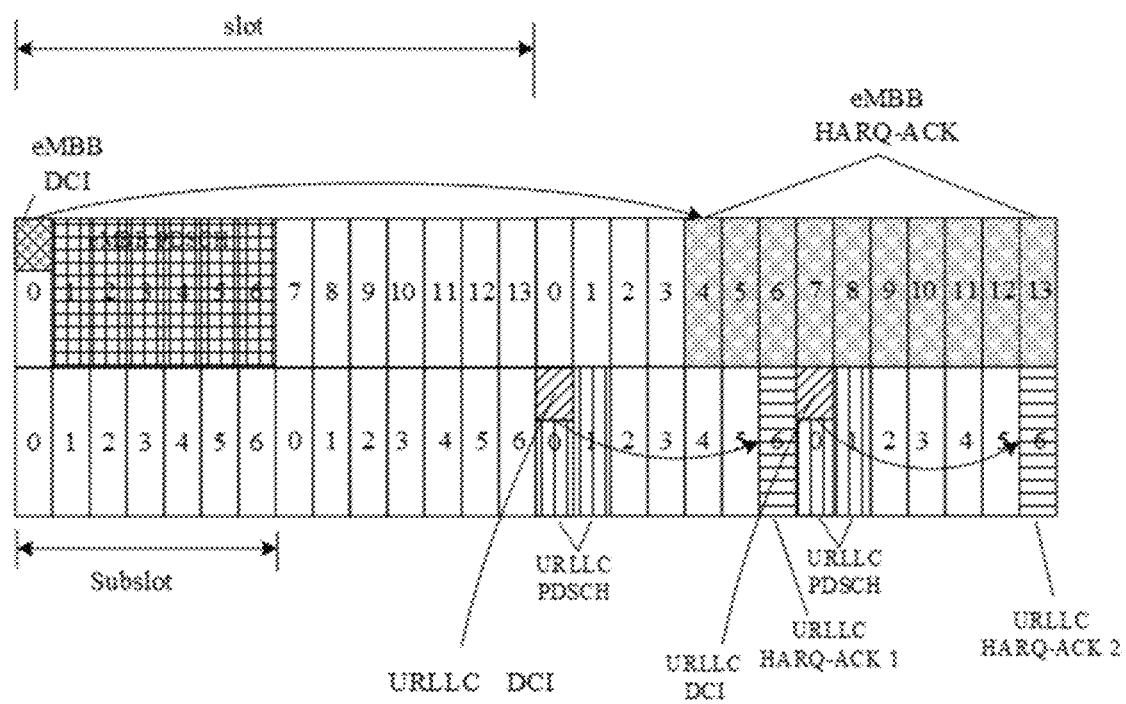
FIG. 4 is a first schematic diagram showing that one eMBB HARQ-ACK information and multiple URLLC HARQ-ACK information overlap in the time domain based on an example.

FIG. 4 is a schematic diagram 1 showing that one eMBB HARQ-ACK information and multiple URLLC HARQ-ACK information overlap in the time domain based on an example. As shown in FIG. 4, the HARQ-ACK of eMBB and both a HARQ-ACK1 of a first URLLC and a HARQ-ACK2 of the second URLLC overlap in the time domain. Specifically, the HARQ-ACK of eMBB is 10 symbols from 4 to 13, the HARQ-ACK1 of the first URLLC is symbol 6, the HARQ-ACK2 of the second URLLC is symbol 13; the symbol 6 from 4 to 13 occupied by the HARQ-ACK of eMBB overlaps with the symbol 6 of the HARQ-ACK1 of the first URLLC in the time domain; the symbol 13 from 4 to 13 occupied by the HARQ-ACK of eMBB overlaps with the symbol 13 of the HARQ-ACK2 of the second URLLC in the time domain, the time domain symbol of the earliest starting position in the PUCCH resource of the HARQ-ACK of the eMBB and the PUCCH resource of the HARQ-ACK1 of the first URLLC is the time domain symbol 4 of the HARQ-ACK of the eMBB, the time domain symbols of the PDSCH corresponding to the HARQ-ACK of the eMBB are 1 to 6, the time domain symbols of the PDSCH corresponding to the HARQ-ACK1 of the first URLLC are time domain symbols 0 to 1, and the time domain symbol of the latest end position of the two is the time domain symbol of the PDSCH of the DCI corresponding to the HARQ-ACK1 of the first URLLC of 1. According to FIG. 4, the symbol 4 of the HARQ-ACK of the eMBB and the symbol 1 corresponding to the PDSCH of the HARQ-ACK1 in the URLLC, the number of intervals of both symbols is 2, which satisfies the timing condition requirement.

Figure 5:
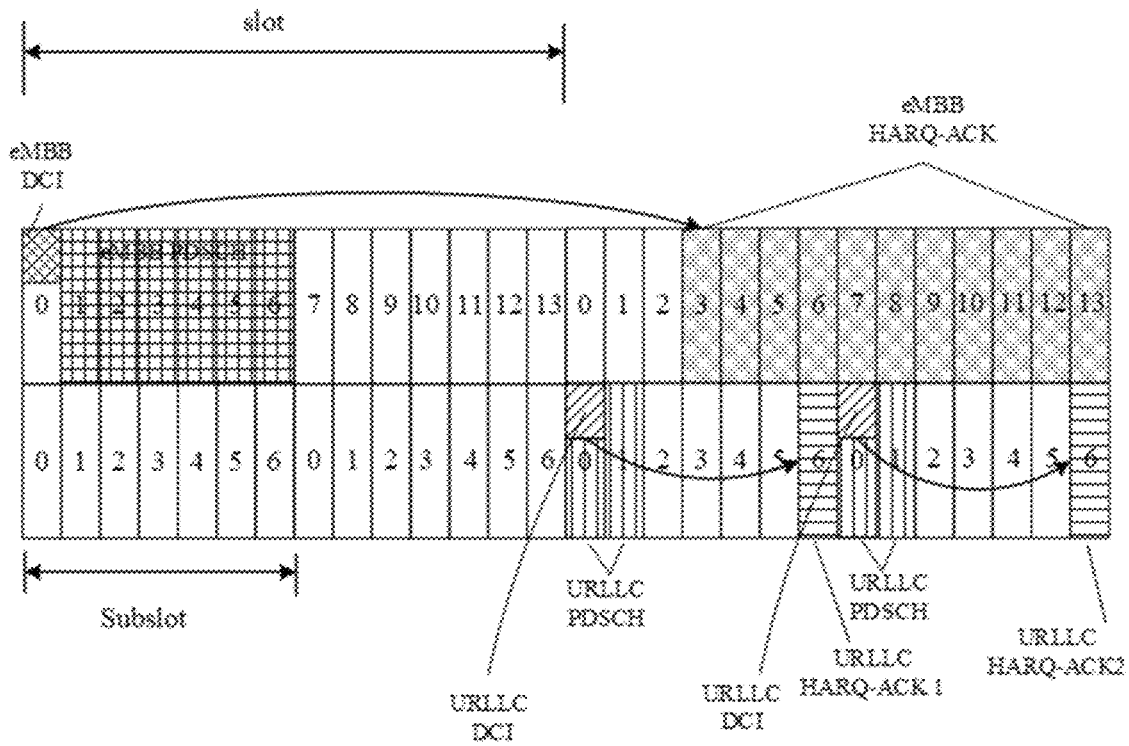
FIG. 5 is a second schematic diagram showing that one eMBB HARQ-ACK information and multiple URLLC HARQ-ACK information overlap in the time domain based on an example.

FIG. 5 is a schematic diagram 2 showing that one eMBB HARQ-ACK information and multiple URLLC HARQ-ACK information overlap in the time domain based on an example. According to FIG. 5, the symbol 3 of the HARQ-ACK of the eMBB and the symbol 1 corresponding to the PDSCH of HARQ-ACK-1 in URLLC, the number of intervals between both symbols is 2, which does not satisfy the timing condition.

Figure 6:
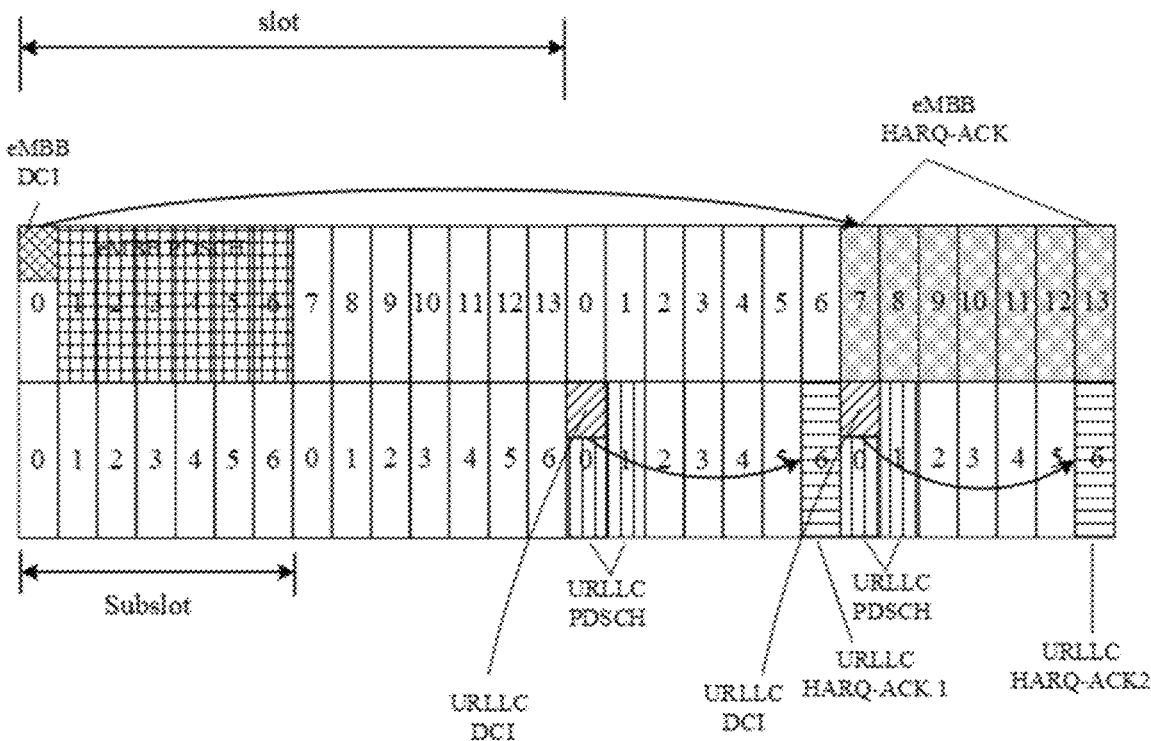
FIG. 6 is a third schematic diagram showing that one eMBB HARQ-ACK information and multiple URLLC HARQ-ACK information overlap in the time domain based on an example.

FIG. 6 is a schematic diagram 3 showing that one eMBB HARQ-ACK information and multiple URLLC HARQ-ACK information overlap in the time domain based on an example. According to FIG. 6 that the HARQ-ACK of the eMBB and the HARQ-ACK1 of the first URLLC does not overlap in the time domain, and only overlaps with the HARQ-ACK2 of the second URLLC in the time domain. Specifically, the HARQ-ACK of the eMBB is 7 symbols in total from 7 to 13, and the HARQ-ACK2 of the second URLLC is symbol 13; the symbol 13 of 7 to 13 occupied by the HARQ-ACK of eMBB overlaps with the symbol 13 of the HARQ-ACK2 of the second URLLC in the time domain; in which the time domain symbol of the earliest starting position of the PUCCH resource of the HARQ-ACK of the eMBB and the PUCCH resource of the HARQ-ACK2 of the second URLLC is the time domain symbol 7 of the HARQ-ACK of the eMBB, the time domain symbol of the PDSCH corresponding to the HARQ-ACK of eMBB is 1 to 6, the time domain symbol of the PDSCH corresponding to the HARQ-ACK2 of the second URLLC is the time domain symbol 1, and the time domain symbol of the latest end position of the two is the time domain symbol of the PDSCH corresponding to the HARQ-ACK2 of the second URLLC of 1. According to FIG. 6, the symbol 7 of the HARQ-ACK of the eMBB and the symbol 1 corresponding to the PDSCH of the HARQ-ACK-1 in the URLLC, and the number of intervals between both symbols is −1, which does not satisfy the timing condition.

Further take FIG. 4 as an example to describe the determination of resource multiplexing. According to FIG. 4, a slot is divided into 2 subslots. The time domain positions of the PUCCH resources of one eMBB HARQ-ACK are symbols 4 to 13, which overlap with the PUCCH resources of two URLLC HARQ-ACKs in the time domain. Assume that the preset time interval is 2 symbols. At this time, the operation of the UE multiplexing the HARQ-ACK of the eMBB and the URLLC is as follows:

Based on the timing of URLLC HARQ-ACKs, determine whether the first URLLC HARQ-ACK and eMBB HARQ-ACK satisfy the timing condition for multiplexing. If satisfied, the two HARQ-ACK information can be multiplexed together, if not, the eMBB HARQ-ACK will be punctured by the URLLC HARQ-ACK information, or the eMBB HARQ-ACK will be discarded. According to FIG. 4, for eMBB HARQ-ACK and the first URLLC HARQ-ACK, based on the schematic diagram of FIG. 4, it can be seen that the time interval T_gap is 2 symbols, which is exactly equal to the preset time interval T, so eMBB HARQ-ACK and the first URLLC HARQ-ACK can satisfy the timing condition for multiplexing, and the eMBB HARQ-ACK and the first URLLC HARQ-ACK can be multiplexed together.

If the multiplexing timing condition is satisfied, select one PUCCH resource from the PUCCH resources configured based on the subslot level to carry the multiplexed HARQ-ACK information, that is, the PUCCH resource set is determined based on the number of bits of the multiplexed HARQ-ACK information; an interval between the subslot where the PUCCH resources of the multiplexed HARQ-ACK are transmitted and the subslot where the PDSCH is located is determined based on the k1 value indicated by the DCI corresponding to the first URLLC HARQ-ACK, k1 is measured by subslot. If the subslot where the PDSCH is located is n, the subslot where the HARQ-ACK is located is n+k1; based on the PUCCH resource ID indicated by the downlink scheduling DCI corresponding to the first URLLC HARQ-ACK, it is determined that the specific index of the PUCCH resource used by the multiplexed HARQ-ACK information.

In selecting multiplexing resources, if the PUCCH resources configured at the slot level are selected, the selected PUCCH resources may overlap with the URLLC HARQ-ACK PUCCH resources of the next subslot in the time domain, further resulting in a complex situation of multiplexing. The advantage of using the PUCCH resources configured at the subslot level is that the PUCCH resources configured based on the subslot level are all included in one subslot, so the selected PUCCH resources will not overlap with the URLLC HARQ-ACK PUCCH resources of the next subslot in the time domain. Therefore, the PUCCH resource configured at the subslot level is preferably selected as the PUCCH resource for carrying the multiplexed HARQ-ACK information.

Figure 7:
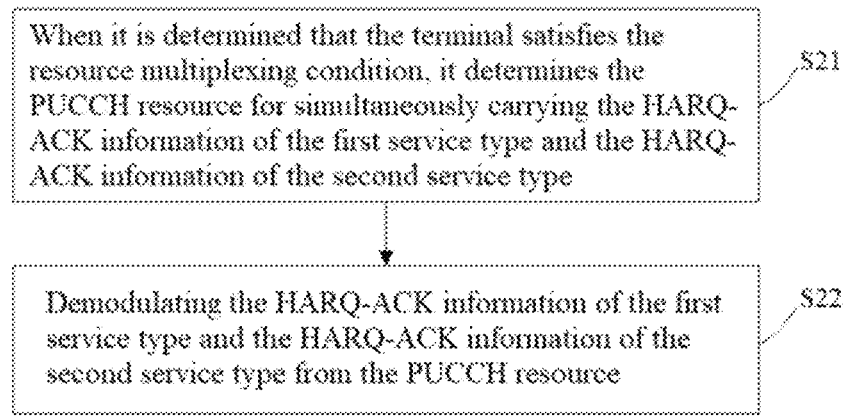
FIG. 7 is a flow chart of an information demodulation method based on an example.

FIG. 7 is a flow chart of a method for information demodulation based on an example, which is applied to the base station side. As shown in FIG. 7, the method includes the following steps:

Step S21, when the terminal is determined to satisfy the resource multiplexing condition, the PUCCH resource is further determined for simultaneously carrying the HARQ-ACK information of the first service type and the HARQ-ACK information of the second service type.

In the solution above, the resource multiplexing condition includes:
the first PUCCH resource of the HARQ-ACK of the first service type and the second PUCCH resource of the HARQ-ACK of the second service type overlap in the time domain, and the first PUCCH resource and the second PUCCH resource satisfy the preset timing condition in the time domain.

In the solution above, the preset timing condition includes:
the interval between the first time domain symbol and the second time domain symbol is greater than or equal to a preset value;
the first time domain symbol is the time domain symbol with the earliest starting position for the first PUCCH resource of the HARQ-ACK of the first service type and the second PUCCH resource of the HARQ-ACK of the second service type;
the second time domain symbol is the time domain symbol with the latest ending position for the PDSCH corresponding to the HARQ-ACK of the first service type and the PDSCH corresponding to the HARQ-ACK of the second service type.

In the solution above, the determination of the PUCCH resource used to simultaneously carry the HARQ-ACK information of the first service type and the HARQ-ACK information of the second service type, includes:
Determining the PUCCH resource set based on the sum of the number of bits of the HARQ-ACK of the first service type and the HARQ-ACK of the second service type;
Based on the PUCCH resource identity indicated by the DCI corresponding to the HARQ-ACK of the second service type, determining the PUCCH resources for transmitting the HARQ-ACK information of the first service type and the HARQ-ACK information of the second service type from the PUCCH resource set.

In the solution above, the method also includes:
When the terminal is determined not to satisfy the resource multiplexing condition, the PUCCH resource set is determined based on the number of bits of the HARQ-ACK of the second service type,
Based on the PUCCH identity indicated by the DCI of the HARQ-ACK of the second service type, determining the PUCCH resource from the PUCCH resource set, and demodulating the HARQ-ACK information of the second service type from the PUCCH resource.

If the base station determines that the terminal does not satisfy the resource multiplexing condition, the HARQ-ACK information of the first service type is discarded or punctured, so the base station does not need to demodulate the information on the PUCCH resource where the HARQ-ACK of the first service type is located.

Step S22, demodulating the HARQ-ACK information of the first service type and the HARQ-ACK information of the second service type from the PUCCH resource.

In the technical solution described in this embodiment, when the terminal is determined to satisfy the resource multiplexing condition, the base station can receive HARQ-ACK information from the corresponding PUCCH resource carrying multiplexing information, and demodulating the HARQ-ACK information of the first service type and the HARQ-ACK information of the second service type.

Figure 8:
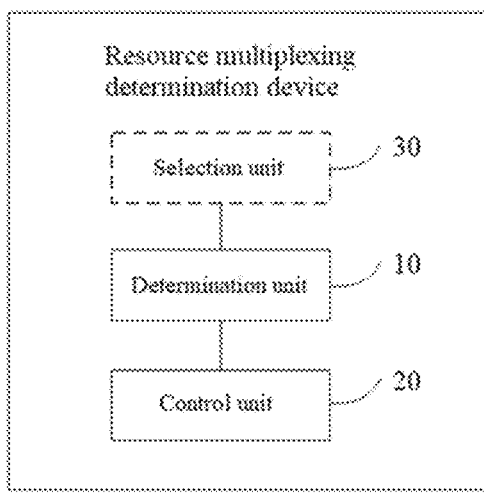
FIG. 8 is a block diagram of a device for determining resource multiplexing based on an example.

FIG. 8 is a schematic diagram of a device for determining resource multiplexing based on an example, where the device for determining resource multiplexing is applied to a terminal side. Referring to FIG. 8, the device includes a determination unit 10 and a control unit 20.

The determination unit 10 is configured that when it is determined that the first PUCCH resource of the HARQ-ACK of the first service type and the second PUCCH resource of the HARQ-ACK of the second service type overlap in the time domain, it determines whether the first PUCCH resource and the second PUCCH resource in the time domain satisfy the preset timing condition;

The control unit 20 is configured that, if the preset timing condition is satisfied, it determines to perform resource multiplexing processing on the HARQ-ACK of the first service type and the HARQ-ACK of the second service type.

As an embodiment, the preset timing conditions include:
the interval between the first time domain symbol and the second time domain symbol is greater than or equal to a preset value;
the first time domain symbol is the time domain symbol with the earliest starting position for the first PUCCH resource of the HARQ-ACK of the first service type and the second PUCCH resource of the HARQ-ACK of the second service type;

The second time domain symbol is the time domain symbol with the latest ending position for the PDSCH corresponding to the HARQ-ACK of the first service type and the PDSCH corresponding to the HARQ-ACK of the second service type.

As an embodiment, the control unit 20 is configured that:
the HARQ-ACK information of the first service type and the HARQ-ACK information of the second service type are carried on the same PUCCH resource for transmission.

As an embodiment, the device also includes:
a selection unit 30 is configured to select the PUCCH resource configured based on the subslot level as the PUCCH resource carrying the HARQ-ACK information of the first service type and the HARQ-ACK information of the second service type.

As an implementation, the selection unit 30 is configured to:
based on the indication of the downlink control information DCI corresponding to the HARQ-ACK information of the second service type, select a PUCCH resource as the PUCCH resource carrying the HARQ-ACK information of the first service type and the HARQ-ACK information of the second service type.

As an implementation, the selection unit 30 is configured to:
determine the PUCCH resource set based on the number of bits of the HARQ-ACK information of the first service type and the number of bits of the HARQ-ACK information of the second service type;
based on the PUCCH resource identity indicated by the DCI corresponding to the HARQ-ACK of the second service type, determine the PUCCH resource for transmitting the HARQ-ACK information of the first service type and the HARQ-ACK information of the second service type from the PUCCH resource set.

In some embodiments, the determination unit 10 is further configured to:
when two or more second PUCCH resources of the HARQ-ACK of the second service type overlap with the first PUCCH resources of the HARQ-ACK of the first service type in the time domain, based on the PUCCH resource identity in time indicated by the corresponding DCI of the HARQ-ACK of the first of the second service type, determine the PUCCH resource for transmitting the HARQ-ACK information of the first service type and the HARQ-ACK information of the second service type from the PUCCH resource set.

Regarding the device in the above-mentioned embodiment, the specific implementation of how each module performs operations has been described in detail in the embodiment of the method, and will not be described in detail herein.

In practical applications, the specific structures of the determination unit 10, the control unit 20 and the selection unit 30 can be realized by the resource multiplexing determining device or a central processing unit (CPU), a micro controller unit (MCU), a digital signal processor (DSP) or a programmable logic controller (PLC) in the terminal to which the resource multiplexing determining device belongs.

The device for determining resource multiplexing described in this embodiment may be disposed on the terminal side.

Those of ordinary skill in the art should understand that the functions of each processing module in the device for determining resource multiplexing in the embodiment of the present disclosure can be understood with reference to the foregoing description of the method for determining resource multiplexing. Each processing module in the resource multiplexing determining device of the embodiments of the disclosure may be implemented by an analog circuit that implements the functions described in the embodiments of the present disclosure, and may also be implemented by running software on a terminal that executes the functions described in the embodiments of the present disclosure.

In the device for determining resource multiplexing based on the embodiment of the present disclosure, when it is determined that the first PUCCH resource of the HARQ-ACK of the first service type and the second PUCCH resource of the HARQ-ACK of the second service type overlap in the time domain, and when the first PUCCH resource and the second PUCCH resource in the time domain satisfy the preset timing condition, it is determined to carry the HARQ-ACK information of the first service type and the HARQ-ACK information of the second service type on the same PUCCH resource for transmission, solving the problem of time domain conflict of multiple PUCCH resources.

Figure 9:
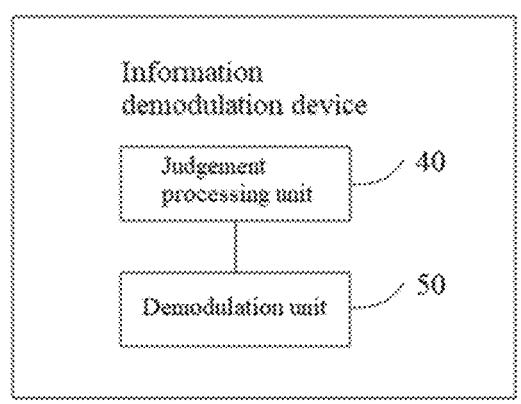
FIG. 9 is a block diagram of an information demodulation device based on an example.

FIG. 9 is a schematic diagram of an information demodulation device based on an example, where the information demodulation device is applied to the base station side. Referring to FIG. 9, the device includes a judgment processing unit 40 and a demodulation unit 50.

The judgment processing unit 40 is configured to determine the PUCCH resource for simultaneously carrying the HARQ-ACK information of the first service type and the HARQ-ACK information of the second service type when the terminal is determined to satisfy the resource multiplexing condition;

The demodulation unit 50 is configured to demodulate the HARQ-ACK information of the first service type and the HARQ-ACK information of the second service type from the PUCCH resource.

As an embodiment, the resource multiplexing condition includes:
the first PUCCH resource of the HARQ-ACK of the first service type and the second PUCCH resource of the HARQ-ACK of the second service type overlap in the time domain, and the first PUCCH resource and the second PUCCH resource in the time domain satisfy the preset timing condition.

As an embodiment, the preset timing condition includes:
the interval between the first time domain symbol and the second time domain symbol is greater than or equal to a preset value;
the first time domain symbol is the time domain symbol with the earliest starting position for the first PUCCH resource of the HARQ-ACK of the first service type and the second PUCCH resource of the HARQ-ACK of the second service type;
the second time domain symbol is the time domain symbol with the latest ending position for the PDSCH corresponding to the HARQ-ACK of the first service type and the PDSCH corresponding to the HARQ-ACK of the second service type.

As an implementation, the judgment processing unit 40 is further used for:
determine the PUCCH resource set based on the sum of the number of bits of the HARQ-ACK of the first service type and the HARQ-ACK of the second service type;
based on the PUCCH resource identity indicated by the DCI corresponding to the HARQ-ACK of the second service type, determine the PUCCH resource for transmitting the HARQ-ACK information the first service type and the HARQ-ACK information of the second service type from the PUCCH resource set.

As an embodiment, the judgment processing unit 40 is further configured to determine the PUCCH resource set based on the number of bits of the HARQ-ACK of the second service type when the terminal is determined not to satisfy the resource multiplexing condition;

The demodulation unit 50 is further configured to determine the PUCCH resource from the PUCCH resource set based on the PUCCH identity indicated by the DCI of the HARQ-ACK of the second service type, and demodulate the HARQ-ACK information of the second service type from the PUCCH resource.

The information demodulation device described in this embodiment may be disposed on the base station side.

Those of ordinary skill in the art should understand that the functions of each processing module in the information demodulation device of the embodiment of the present disclosure can be understood by referring to the relevant description of the foregoing information demodulation method, each processing module in the information demodulation device of the embodiments of the disclosure may be implemented by an analog circuit that implements the functions described in the embodiments of the present disclosure, and may also be implemented by running software on a terminal that executes the functions described in the embodiments of the present disclosure.

The information demodulation device described in the embodiment of the present disclosure can receive HARQ-ACK information from the corresponding PUCCH resource carrying the multiplexing information when the terminal is determined to satisfy the resource multiplexing condition, and demodulate the HARQ-ACK information of the first service type and the HARQ-ACK information of the second service type.

Figure 10:
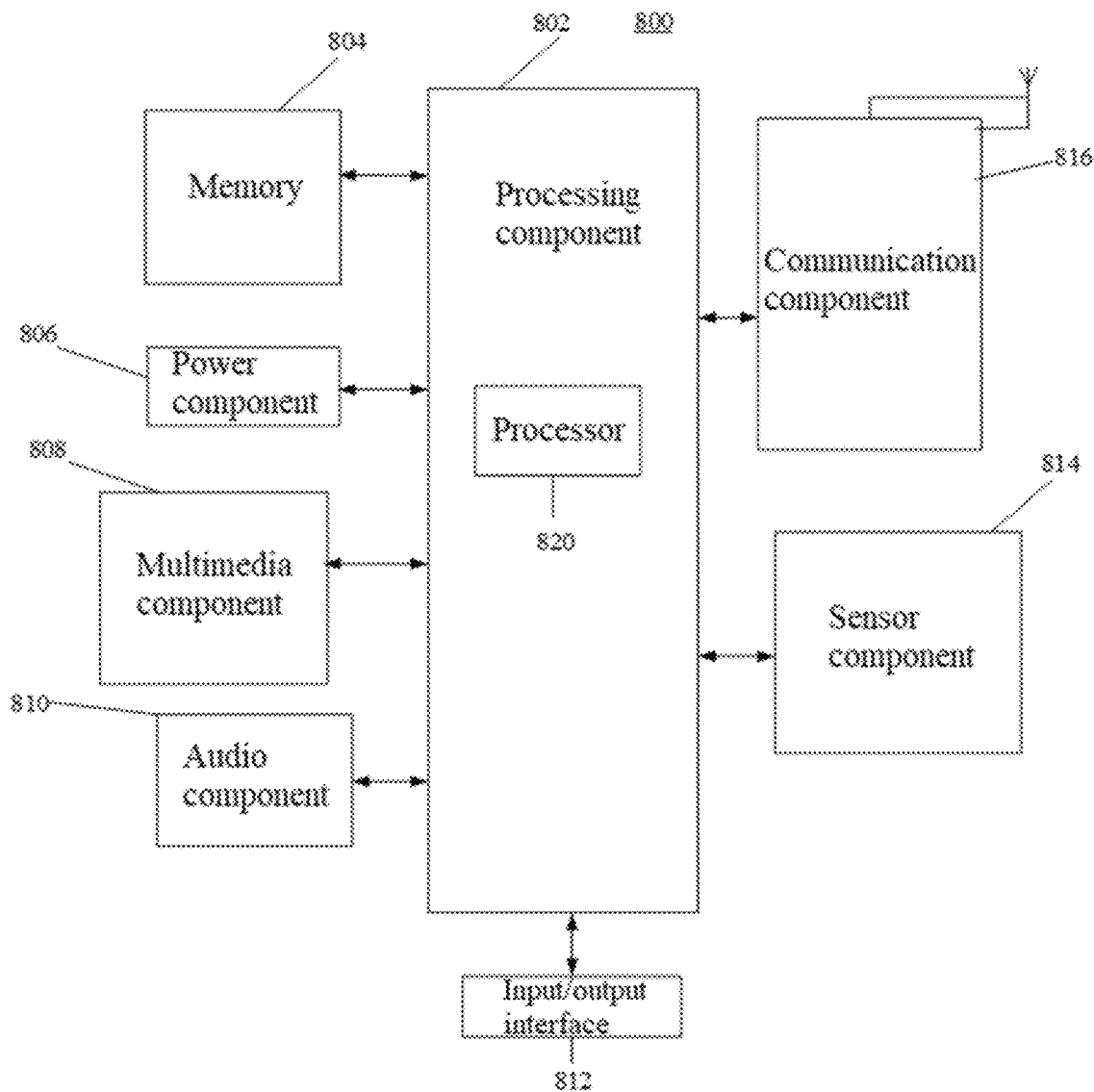
FIG. 10 is a block diagram of a device 800 for determining resource multiplexing or information demodulation processing based on an example.

FIG. 10 is a block diagram of a device 800 for determining resource multiplexing processing or information demodulation processing based on an example. For example, device 800 may be a mobile phone, computer, digital broadcast terminal, messaging device, game console, tablet device, medical device, fitness device, personal digital assistant and the like.

Referring to FIG. 10, the device 800 may include one or more of the following components: a processing component 802, a memory 804, a power component 806, a multimedia component 808, an audio component 810, an input/output (I/O) interface 812, sensor component 814 and communication assembly 816.

The processing component 802 generally controls the overall operation of the device 800, such as operations associated with display, phone calls, data communications, camera operations as well as recording operations. The processing component 802 can include one or more processors 820 to execute instructions to perform all or some of the steps of the methods described above. Additionally, processing component 802 may include one or more modules that facilitate interaction between processing component 802 and another component. For example, processing component 802 may include a multimedia module to facilitate interaction between multimedia component 808 and processing component 802.

Memory 804 is configured to store various types of data to support operations of device 800. Examples of such data include instructions for any application or method operating on device 800, contact data, phonebook data, messages, pictures, videos and the like. The memory 804 may be implemented by any type of volatile or non-volatile storage device or a combination thereof, such as Static Random-Access Memory (SRAM), Electrically Erasable Programmable Read Only Memory (EEPROM), Erasable Programmable Read Only Memory (EPROM), Programmable Read Only Memory (PROM), Read Only Memory (ROM), magnetic memory, flash memory, magnetic disk or optical disk.

Power component 806 supplies power to various components of device 800. Power components 806 may include a power management system, one or more power sources as well as other components associated with generating, managing and distributing power for device 800.

Multimedia component 808 includes a screen that provides an output interface between the device 800 and the user. In some embodiments, the screen may include a Liquid Crystal Display (LCD) and a Touch Panel (TP). If the screen includes a touch panel, the screen may be implemented as a touch screen to receive input signals from a user. The touch panel includes one or more touch sensors to sense touch, swipe and gestures on the touch panel. The touch sensor may not only sense the boundaries of a touch or swipe action, but also detect the duration and pressure associated with the touch or swipe action. In some embodiments, the multimedia component 808 includes a front-facing camera and/or a rear-facing camera. When the device 800 is in an operation mode, such as a shooting mode or a video mode, the front facing camera and/or the rear facing camera may receive external multimedia data. Each of the front and rear facing cameras can be of a fixed optical lens system or have focal length and optical zoom capability.

Audio component 810 is configured to output and/or input audio signals. For example, the audio component 810 includes a microphone (MIC), which is configured to receive external audio signals when the device 800 is in an operating mode, such as a calling mode, a recording mode and a voice recognition mode. The received audio signal may be further stored in memory 804 or transmitted via communication component 816. In some embodiments, audio component 810 also includes a speaker for outputting audio signals.

The I/O interface 812 provides an interface between the processing component 802 and a peripheral interface module, which may be a keyboard, a click wheel, a button or the like. These buttons may include, but are not limited to: home button, volume buttons, start button, and lock button.

Sensor component 814 includes one or more sensors for providing status assessment of various aspects of device 800. For example, the sensor component 814 can detect the open/closed state of the device 800, the relative positioning of components, such as the display and keypad of the device 800, and the sensor component 814 can also detect a change in the position of the device 800 or a component of the device 800, the presence or absence of user contact with the device 800, the orientation or acceleration/deceleration of the device 800 and the temperature change of the device 800. Sensor component 814 may include a proximity sensor configured to detect the presence of nearby objects in the absence of any physical contact. Sensor component 814 may also include a light sensor, such as a Complementary Metal Oxide Semiconductor (CMOS) or Charge-coupled Device (CCD) image sensor, for use in imaging applications. In some embodiments, the sensor component 814 may also include an acceleration sensor, a gyroscope sensor, a magnetic sensor, a pressure sensor or a temperature sensor.

Communication component 816 is configured to facilitate wired or wireless communication between device 800 and another device. Device 800 may access wireless networks based on communication standards such as Wi-Fi, 2G and 3G or a combination thereof. In one example, the communication component 816 receives broadcast signals or broadcast-related information from an external broadcast management system via a broadcast channel. In an example, the communication component 816 also includes a Near Field Communication (NFC) module, so as to facilitate short-range communication. For example, the NFC module may be realized based on Radio Frequency Identification (RFID) technology, Infrared Data Association (IrDA) technology, Ultra Wide Band (UWB) technology, Bluetooth (BT) technology and other technologies.

In an example, the device 800 may be implemented by one or more application specific integrated circuits (ASIC), digital signal processors (DSP), digital signal processing devices (DSPD), Programmable Logic Device (PLD), Field Programmable Gate Array (FPGA), controller, microcontroller, microprocessor or other electronic elements for performing the above mentioned resource multiplexing determination method or information demodulation method.

In an example, a non-transitory computer storage medium including executable instructions is also provided, such as a memory 804 including executable instructions that can be executed by the processor 820 of the device 800, so as to accomplish the above resource multiplexing determination method. For example, the non-transitory computer storage medium may be a ROM, a random access memory (RAM), a CD-ROM, a magnetic tape, a floppy disk, an optical data storage device and the like.

Figure 11:
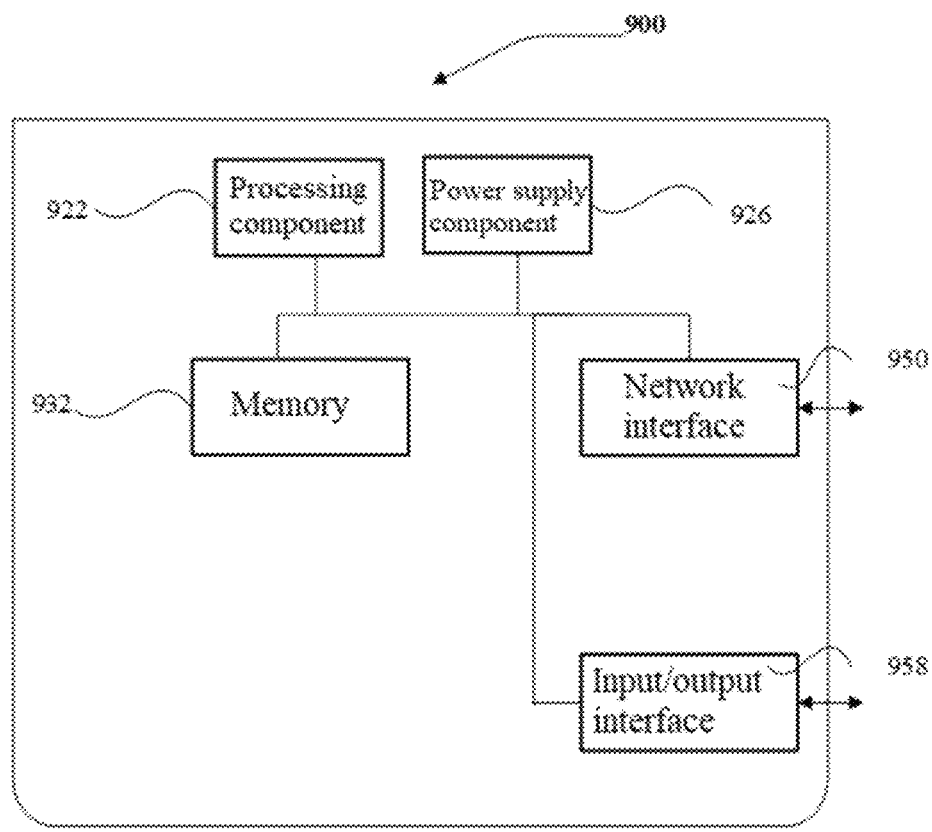
FIG. 11 is a block diagram of a device 900 for determining resource multiplexing or information demodulation processing based on an example.

FIG. 11 is a block diagram of a device 900 for determining resource multiplexing processing or information demodulation processing based on an example. For example, the device 900 may be provided as a server. Referring to FIG. 11, device 900 includes a processing component 922, which further includes one or more processors, and a memory resource, represented by memory 932, for storing instructions executable by processing component 922, such as an application program. An application program stored in memory 932 may include one or more modules, each corresponding to a set of instructions. In addition, the processing component 922 is configured to execute the instructions to perform the above mentioned method for determining resource multiplexing or information demodulation.

Device 900 may also include a power supply component 926 configured to perform power management of device 900, a wired or wireless network interface 950 configured to connect device 900 to a network and an input output (I/O) interface 958. Device 900 may be operated based on an operating system stored in memory 932, such as Windows Server™ Mac OS X™, Unix™, Linux™, FreeBSD™ or the like.

The technical solutions provided by the embodiments of the present disclosure have the following beneficial effects:

When the first PUCCH resource of the HARQ-ACK of the first service type is determined to overlap with the second PUCCH resource of the HARQ-ACK of the second service type in the time domain, and the first PUCCH resource and the second PUCCH resource in the time domain satisfy the preset timing condition, it is determined to perform resource multiplexing processing on the HARQ-ACK of the first service type and the HARQ-ACK of the second service type, so as to resolve the problem of time domain conflict of multiple PUCCH resources.

The technical solutions described in the embodiments of the present disclosure may be combined arbitrarily provided that there is no conflict.

Other embodiments of the disclosure will readily occur to those of ordinary skill in the art upon consideration of the specification and practice of the disclosure described herein. This disclosure is intended to cover any variations, uses or adaptations of the disclosure that follow the general principles of the disclosure and include common knowledge or conventional techniques in the art not disclosed by this disclosure. The specification and examples are to be regarded as exemplary only, with the true scope and spirit of the disclosure being indicated by the following claims.

It should be understood that the present disclosure is not limited to the precise structures described above and illustrated in the accompanying drawings, and that various modifications and changes may be made without departing from its scope. The scope of the present disclosure is limited only by the appended claims.

INDUSTRIAL APPLICABILITY

In the technical solutions of the embodiments of the present disclosure, when the first PUCCH resource of the HARQ-ACK of the first service type is determined to overlap with the second PUCCH resource of the HARQ-ACK of the second service type in the time domain, and when the first PUCCH resource and the second PUCCH resource satisfy the preset timing condition in the time

The invention claimed is:

1. A method for determining resource multiplexing, comprising:
in response to determining that a first physical uplink control channel (PUCCH) resource of a hybrid automatic repeat request response (HARQ-ACK) of a first service type overlaps with a second PUCCH resource of an HARQ-ACK of a second service type in a time domain, determining whether the first PUCCH resource and the second PUCCH resource on the time domain satisfy a preset timing condition; and
in response to determining that the preset timing condition is satisfied, determining to perform resource multiplexing processing on the HARQ-ACK of the first service type and the HARQ-ACK of the second service type; the resource multiplexing process includes:
HARQ-ACK information of the first service type and HARQ-ACK information of the second service type are carried on a same PUCCH resource for transmission;
based on an indication of a downlink control information (DCI) corresponding to the HARQ-ACK information of the second service type, selecting a PUCCH resource as the same PUCCH resource carrying the HARQ-ACK information of the first service type and the HARQ-ACK information of the second service type; wherein,
determining a PUCCH resource set based on a number of bits of the HARQ-ACK information of the first service type and a number of bits of the HARQ-ACK information of the second service type; and
based on a PUCCH resource identity indicated by the DCI corresponding to the HARQ-ACK of the second service type, determining the same PUCCH resource for transmitting the HARQ-ACK information of the first service type and the HARQ-ACK information of the second service type from the PUCCH resource set.

2. The method of claim 1, wherein the preset timing condition comprising:
an interval between a first time domain symbol and a second time domain symbol is greater than or equal to a preset value;
wherein, the first time domain symbol is a time domain symbol with an earliest starting position for the first PUCCH resource of the HARQ-ACK of the first service type and the second PUCCH resource of the HARQ-ACK of the second service type; and
wherein, the second time domain symbol is a time domain symbol with a latest ending position for a physical downlink shared channel (PDSCH) corresponding to the HARQ-ACK of the first service type and a PDSCH corresponding to the HARQ-ACK of the second service type.

3. The method of claim 1, wherein, based on the PUCCH resource identity indicated by the DCI corresponding to the HARQ-ACK of the second service type, determining the same PUCCH resource for transmitting the HARQ-ACK information of the first service type and the HARQ-ACK information of the second service type from the PUCCH resource set, comprises:
in response to determining that two or more second PUCCH resources of the HARQ-ACK of the second service type are overlapping with the first PUCCH resource of the HARQ-ACK of the first service type in the time domain, based on the PUCCH resource identity indicated by the corresponding DCI of the first of the HARQ-ACK of the second service type, determining the same PUCCH resource for transmitting the HARQ-ACK information of the first service type and the HARQ-ACK information of the second service type from the PUCCH resource set.

4. A method for information demodulation, comprising:
in response to determining that a terminal satisfies a resource multiplexing condition, determining a physical uplink control channel (PUCCH) resource for simultaneously carrying a hybrid automatic repeat request response (HARQ-ACK) information of a first service type and an HARQ-ACK information of a second service type; and
demodulating the HARQ-ACK information of the first service type and the HARQ-ACK information of the second service type from the PUCCH resource;
wherein, determining the PUCCH resource for simultaneously carrying the HARQ-ACK information of the first service type and the HARQ-ACK information of the second service type comprises:
determining a PUCCH resource set based on a sum of a number of bits of the HARQ-ACK information of the first service type and a number of bits of the HARQ-ACK information of the second service type; and
based on a PUCCH resource identity indicated by a downlink control information (DCI) corresponding to the HARQ-ACK information of the second service type, determining a PUCCH resource for transmitting the HARQ-ACK information of the first service type and the HARQ-ACK information of the second service type from the PUCCH resource set.

5. The method of claim 4, wherein the resource multiplexing condition comprising:
a first PUCCH resource and a second PUCCH resource overlapping in the time domain, and the first PUCCH resource and the second PUCCH resource in the time domain satisfying the preset timing condition; wherein the first PUCCH resource is a PUCCH resource of the HARQ-ACK information of the first service type, and the second PUCCH resource is a PUCCH resource of the HARQ-ACK information of the second service type.

6. The method of claim 5, wherein the preset timing condition comprising:
an interval between a first time domain symbol and a second time domain symbol is greater than or equal to a preset value;
wherein, the first time domain symbol is a time domain symbol with an earliest starting position for the first PUCCH resource of the HARQ-ACK of the first service type and the second PUCCH resource of the HARQ-ACK of the second service type; and
wherein, the second time domain symbol is a time domain symbol with a latest ending position for a physical downlink shared channel (PDSCH) corresponding to the HARQ-ACK of the first service type and a PDSCH corresponding to the HARQ-ACK of the second service type.

7. The method of claim 4, further comprising:
in response to determining that the terminal does not satisfy the resource multiplexing condition, determining the PUCCH resource set based on the number of bits of the HARQ-ACK of the second service type; and determining the PUCCH resource from the PUCCH resource set based on the PUCCH identity indicated by the DCI of the HARQ-ACK of the second service type, and demodulating the HARQ-ACK information of the second service type from the PUCCH resource.

8. An information demodulation device, comprising:

a processor;

a memory, for storing instructions executable by the processor;

wherein, the processor is configured to implement the information demodulation method based on claim 4 when executing the executable instructions.

9. A device for determining resource multiplexing, comprising:

a processor;

a memory, for storing instructions executable by the processor;

wherein, the processor is configured to implement acts comprising:

in response to determining that a first physical uplink control channel (PUCCH) resource of a hybrid automatic repeat request response HARQ-ACK of a first service type overlaps with a second PUCCH resource of an HARQ-ACK of a second service type in a time domain, determining whether the first PUCCH resource and the second PUCCH resource on the time domain satisfy a preset timing condition; and in response to determining that the preset timing condition is satisfied, determining to perform resource multiplexing processing on the HARQ-ACK of the first service type and the HARQ-ACK of the second service type;

the resource multiplexing process includes:

HARQ-ACK information of the first service type and HARQ-ACK information of the second service type are carried on the same PUCCH resource for transmission;

based on an indication of a downlink control information (DCI) corresponding to the HARQ-ACK information of the second service type, selecting a PUCCH resource as the same PUCCH resource carrying the HARQ-ACK information of the first service type and the HARQ-ACK information of the second service type; wherein, determining a PUCCH resource set based on a number of bits of the HARQ-ACK information of the first service type and a number of bits of the HARQ-ACK information of the second service type; and based on a PUCCH resource identity indicated by the DCI corresponding to the HARQ-ACK of the second service type, determining the same PUCCH resource for transmitting the HARQ-ACK information of the first service type and the HARQ-ACK information of the second service type from the PUCCH resource set.

* * * * *